United States Patent [19]

Reinmoller et al.

[11] 3,912,215
[45] Oct. 14, 1975

[54] SEAT CONSTRUCTION

[75] Inventors: Adolf Reinmoller; Paul Werner, both of Remscheid, Germany

[73] Assignee: Keiper Fritz, Remscheid-Haten, Germany

[22] Filed: Feb. 6, 1974

[21] Appl. No.: 440,039

[30] Foreign Application Priority Data

Feb. 10, 1973 Germany.............................. 2306535

[52] U.S. Cl................. 248/421; 248/419; 248/422
[51] Int. Cl.².......................................... F16M 13/00
[58] Field of Search.......... 248/419, 420, 421, 157, 248/422, 423, 394, 396, 397; 297/344, 345, 348; 74/96, 98

[56] References Cited
UNITED STATES PATENTS

| | | | |
|---|---|---|---|
| 2,076,309 | 4/1937 | Whedon.............................. | 248/421 |
| 2,712,346 | 7/1955 | Sprinkle............................. | 297/345 |
| 2,795,267 | 6/1957 | Williams............................. | 248/394 |
| 2,809,689 | 10/1957 | Garvey et al. ..................... | 248/419 |
| 3,006,594 | 10/1961 | Gruendler.......................... | 248/419 |
| 3,049,330 | 8/1962 | Coons et al........................ | 74/96 |
| 3,208,299 | 9/1965 | Leonard et al. .................. | 74/98 |
| 3,352,215 | 11/1967 | Wainberg.......................... | 74/98 |
| 3,405,900 | 10/1968 | Robinson........................... | 248/396 |
| 3,460,793 | 8/1969 | Posh .................................. | 248/396 |
| 3,692,271 | 9/1972 | Homier et al...................... | 248/396 |

Primary Examiner—Roy D. Frazier
Assistant Examiner—Robert A. Hafer
Attorney, Agent, or Firm—Michael S. Striker

[57] ABSTRACT

A seat, particularly of an automotive vehicle, has a support and a seat frame on the support. A plurality of elongated levers is provided, each being pivoted adjacent one end portion to the support and intermediate the one end its opposite end portion to the seat frame. A lever is accessible to a user and is connected with a gear transmission so that, when the lever is turned about a shaft journaled in the support, the gear transmission engages a gear segment formed on one of the levers connecting the support and the seat frame, thus causing the one lever to be pivoted upwardly or downwardly. This movement is transmitted by coupling arrangements to the other levers connecting the support and the seat frame, so that the latter is either raised or lowered, depending upon the direction in which the actuating lever is turned. A spring-loaded friction brake is provided which maintains the seat frame in the selected position when the actuating lever is released.

17 Claims, 5 Drawing Figures

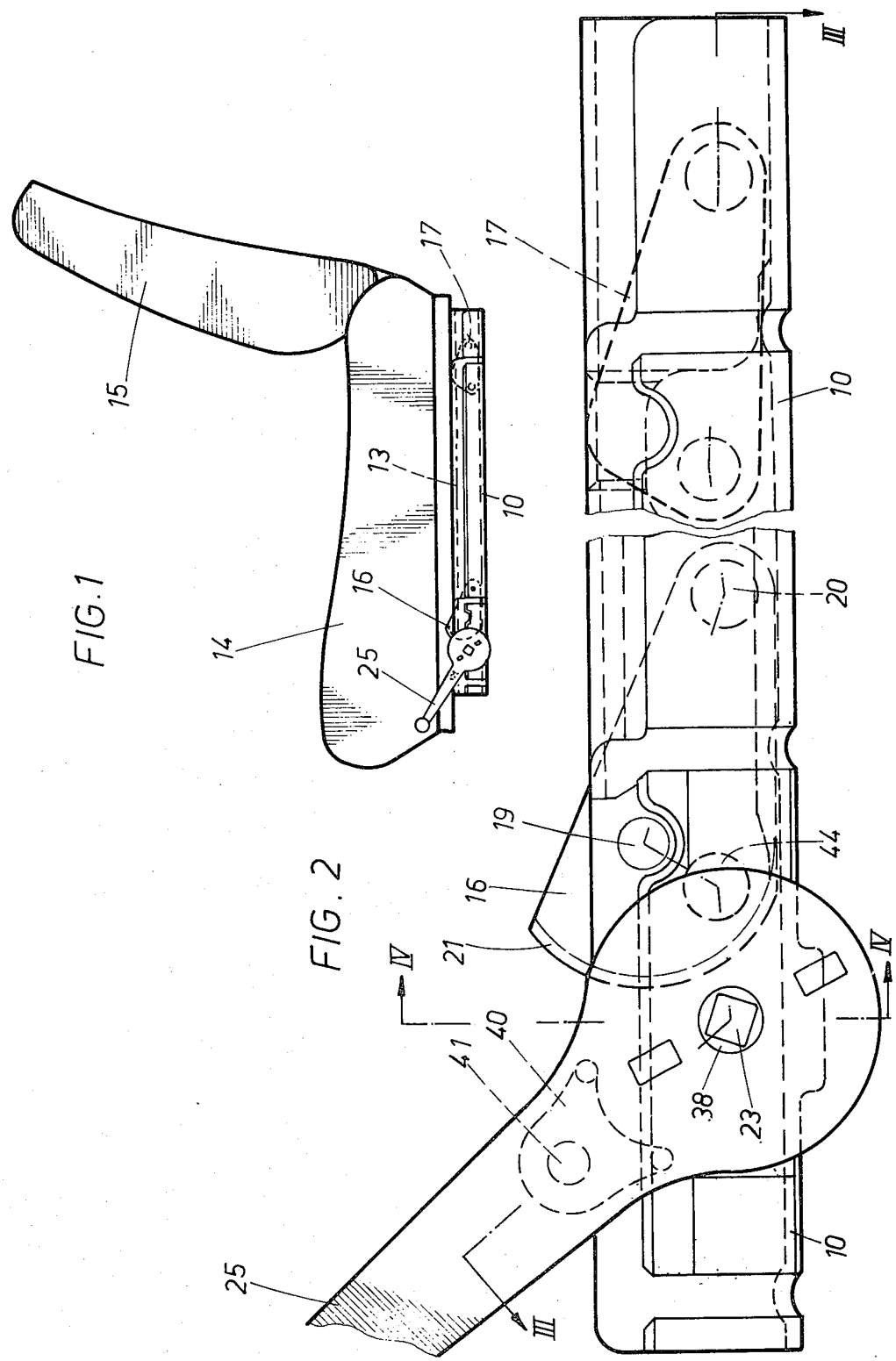

ized as characteristic for the invention are set forth in particular in
SEAT CONSTRUCTION

BACKGROUND OF THE INVENTION:

The present invention relates generally to a seat construction, and more particularly — although not exclusively — to a vehicle seat such as finds use in automotive vehicles.

It is becoming more and more common in modern automobiles to make the seats, at least the seat of the driver, adjustable not only in forward and rearward direction, but also to make them adjustable so that they can be raised and lowered. Evidently, drivers of different body heights may find a given fixed seat adjustment to be either too high or too low and therefore prefer to be able to re-adjust the height of the seat to their own preference.

The prior-art arrangements for effecting adjustments in the height of the seat fall into one of two categories, namely they are either based upon an electrically operated drive or upon a manually operated one. The present invention is concerned with the manually operated type, electrically operated drives being rather expensive and therefore not practical in most applications, in addition to which they are relatively bulky and cannot be used in most of the smaller automobiles where there is simply not sufficient space available to accommodate their components.

Insofar as mechanically operated arrangements are known from the prior art, they have various disadvantages known to those conversant with this field of endeavor. One of these is the fact that they cannot be precisely adjusted because, once a particular seat level has been chosen and the seat has been moved to this level and the actuating member released, the detent arrangement used in the prior art for preventing returning of the seat to its lower position does not immediately operate, but becomes effective only after the seat has returned by some distance towards its lowermost position. This means that it is very difficult to position the seat exactly at the level which is desired. Moreover, it is very well possible in the prior-art constructions of this type for a sudden change in the level of the seat to occur before the detent arrangement becomes effective, and inasmuch as quite frequently seat adjustments are carried out by operators of motor vehicles while the vehicle is in motion, this evidently brings with it a substantial danger of accidents.

SUMMARY OF THE INVENTION

Accordingly, it is an object of the present invention to provide a seat construction which avoids the aforementioned disadvantages.

More particularly, it is an object of the present invention to provide a novel seat wherein the level to which the seat is to be raised or lowered can be precisely selected.

An additional object of the invention is to provide such a novelty which is provided with a retaining or blocking arrangement that operates more reliably than those known from the prior art and which assures that the seat will always be immediately fixed and retained in its selected position as soon as the operating element is released by a user.

In keeping with these objects, and with others which will become apparent hereafter, one feature of the invention resides in a seat, particularly in a vehicle seat, in a combination which comprises a support structure, a seat frame structure on the support structure, and a plurality of elongated coupling members. Pivot means is provided, and includes a pair of pivots for each of the coupling members. A first pivot of each pair connects the associated coupling member to the support structure and a second pivot of the pair is spaced longitudinally of the coupling member from the first pivot and connects the coupling member to the seat frame structure. Actuating means is provided for pivoting the coupling members about the respective pivots thereof so as to raise or lower the seat frame structure relative to the support structure between a plurality of selectable positions. Retaining means retains the seat frame structure in the respective selected position.

The retaining means in the construction according to the present invention causes an automatic blocking of the seat against movement as soon as the operating part of the actuating means is released by the user.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side-elevational view showing a seat structure embodying the invention;

FIG. 2 is a fragmentary side-elevational detail view, showing a detail of the seat structure with the seat cushion removed for better view;

DESCRIPTION OF THE PREFERRED EMBODIMENTS

Figure 3:
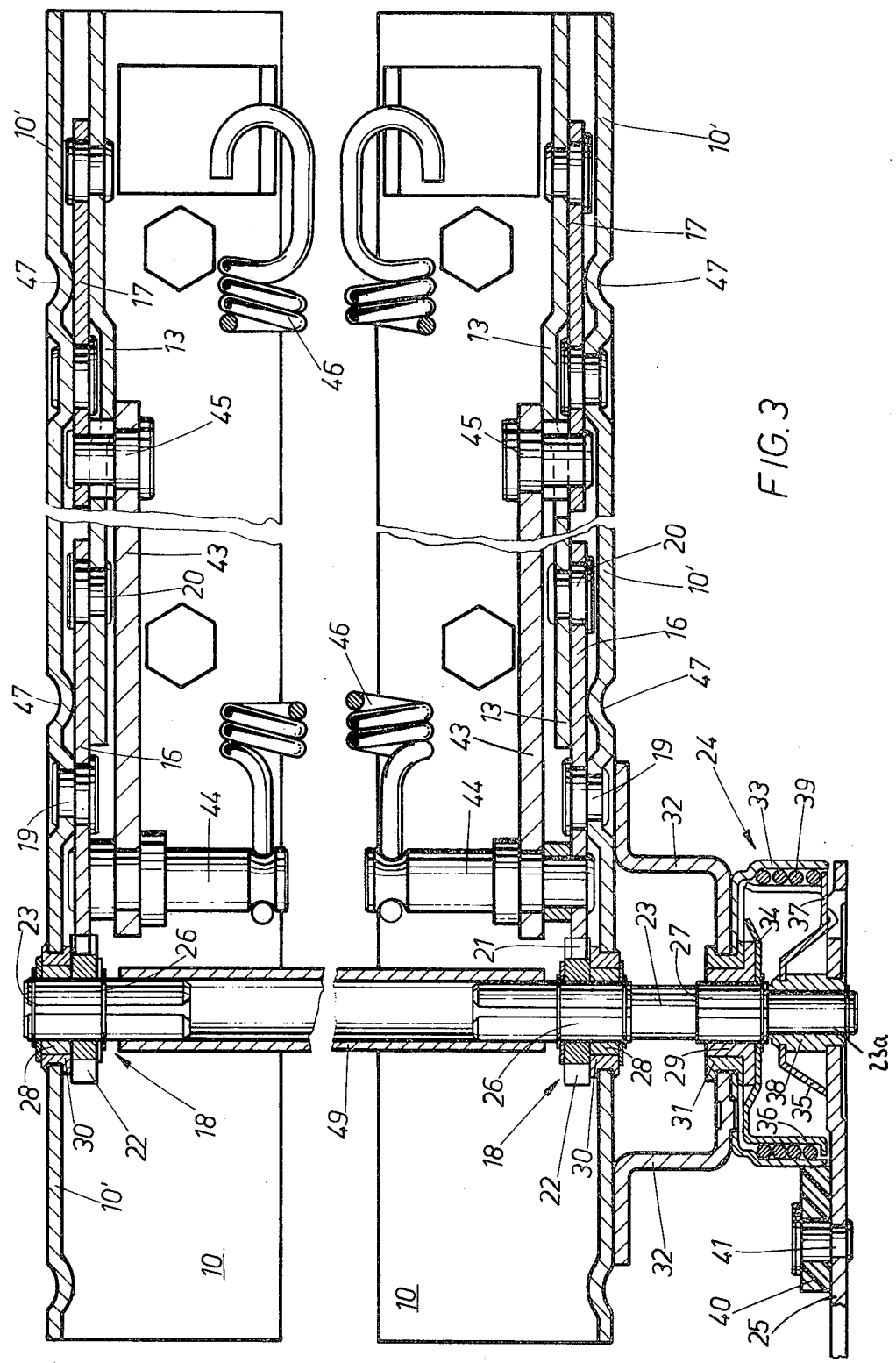
FIG. 3 is a section taken on line III—III of FIG. 2.

FIGS. 1–5 illustrate the invention on hand of a single example, and we have chosen to explain the invention on hand of a vehicle seat of an automotive vehicle. However, it should be understood that the seat could be in a different kind of vehicle and, in fact, might even be a non-vehicle seat.

In any case, reference numeral 10 identifies a support structure which in conventional manner of vehicle seats is composed of a plurality of longitudinal frame members and provided with guide rails 11 by means of which (see FIG. 3) it can be shifted longitudinally along bottom rails 12. This is the conventional adjustment by means of which the seat of an automotive vehicle can be closer towards and farther away from the steering wheel of the vehicle. Evidently, the support structure 10 could be otherwise supported on a floor or other surface.

A seat frame structure 13 is provided which is carried by the support structure 10 and which in a manner known per se and therefore requiring no detailed discussion is provided with an upholstery cushion 14 and with a backrest 15.

The purpose of the invention is to make the seat frame structure 13 with its cushion 14 and backrest 15 adjustable with reference to the support structure 10, such that the seat frame structure 13 can be raised and lowered with reference to the support structure 10.

FIGS. 2 and 3 show particularly clearly that for this purpose the seat frame structure 13 is connected with the support structure 10 by means of elongated coupling members 16, 17 in form of levers or arms. The arrangement is such that when the coupling members 16, 17 are pivoted in clockwise or counterclockwise direction in FIGS. 2 and 3, the seat frame structure 13 will be respectively raised and lowered with respect to the support structure 10.

The drawing shows that at each side of the seat there is provided a forward (that being the left-hand end of the seat cushion 14 in FIG. 1) coupling member 16 and a rearward (that being the right-hand end of FIG. 1 where the backrest 15 is located) coupling member 17. The coupling members 16 in this embodiment are constructed not only as coupling members but serve also as gear levers of an actuating arrangement 18. Each of the coupling members 16 is pivoted at 19 to an upstanding side wall portion 10′ of the support structure 10, and is further pivoted by means of a pivot 20 to the seat frame structure 13. In the lowest possible position of the seat frame structure 13 relative to the support structure 10, the axes of the pivots 19 are located at a level which is higher than that of the axes of the pivots 20. The left-hand end portion (see FIG. 2) of the coupling members 16 is formed as a gear segment 21 which meshes with a gear 22 but has a larger radius of curvature than the latter. The gear 22 is the component through which motion is transmitted to the coupling members 16 and thus to the seat frame structure 13. It is connected via a respective shaft 23 with an actuating member 25 (see also FIG. 1) that can be grasped by a user of the seat and pivoted in clockwise or counterclockwise direction, as will be discussed later. Portions 26, 27 of the respective shaft 23 are of polygonal cross-section. The gear 22 is mounted on the portion 26 of the respective shaft 23, having a central passage of a configuration that mates with that of the cross-section of the portion 26, so that the gear can turn with but not relative to the shaft 23. Associated with the portion 27 is a portion of a spring-loaded friction brake 24 which will be described later. Each of the portions 26, 27 is surrounded with a tubular journaling sleeve 28, 29, respectively, by means of which the respective shafts 23 are journaled in bearings 30, 31 for rotation. The bearing 30 is mounted in the side wall portion 10′ and the bearing 31 in a mounting bracket 32 which is secured to the side wall portion 10′, by welding, by screw threads or the like, so that the shaft 23 with which the friction brake 24 is associated, has dual support.

Figure 4:
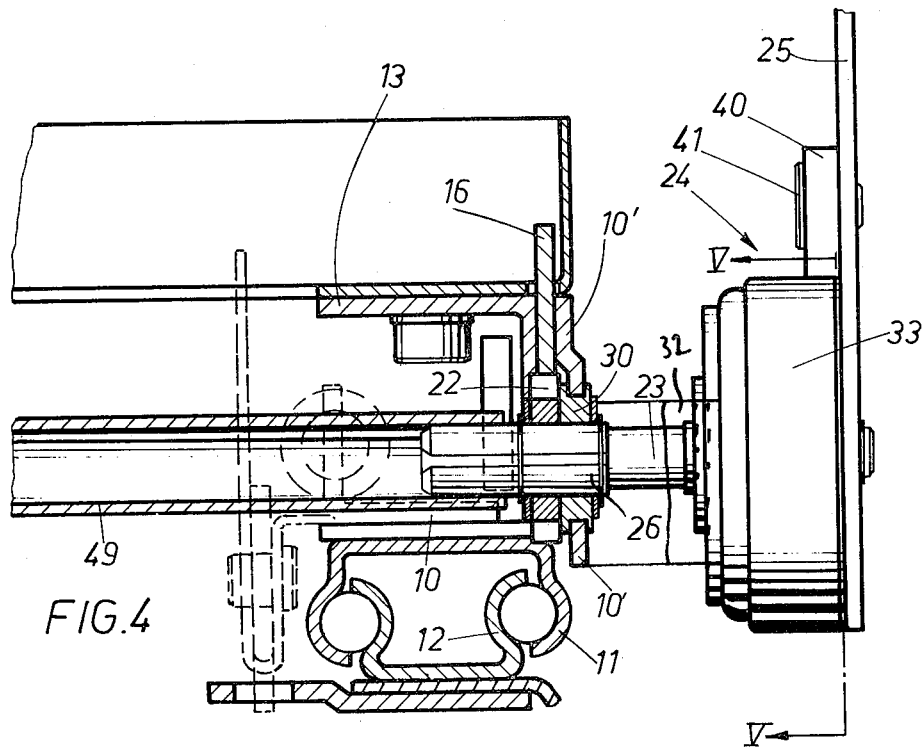
FIG. 4 is a section taken on line IV—IV of FIG. 2.
Figure 5:
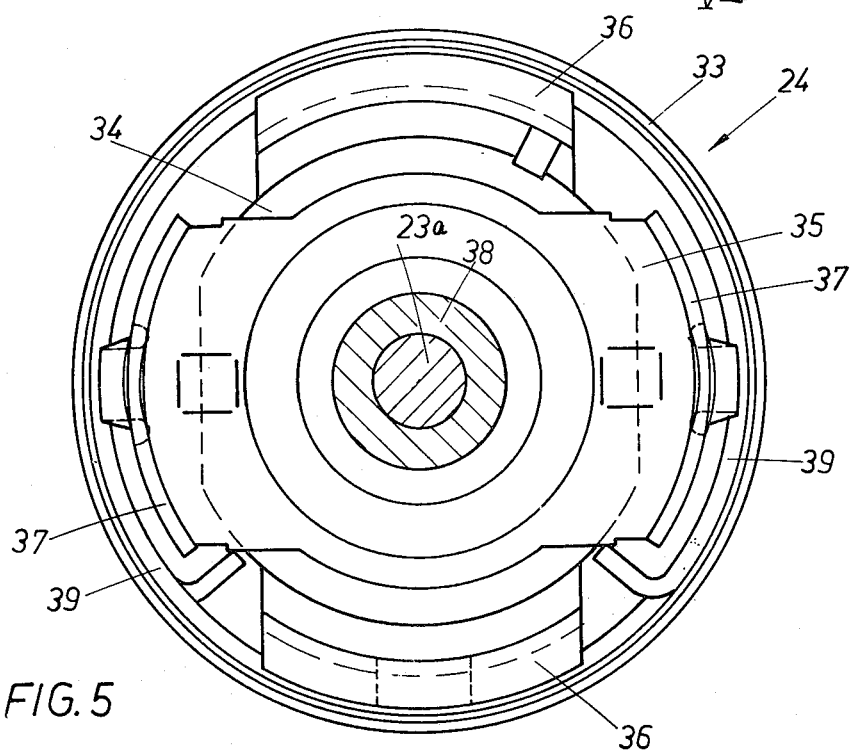
FIG. 5 is a section taken on line V—V of FIG. 4.

Describing now the friction brake 24 in more detail, attention is directed to FIGS. 3–5 in particular. It will be seen that it has a cupped brake drum 33 which is connected with the mounting bracket 32, for instance by means of the bearing 31 as shown, and/or by other means such as welding. The brake drum 33 must not turn with reference to the bracket 32, as will be evident, and the securing will be effected accordingly. The brake 24 further comprises two coupling parts 34, 35; the former is mounted on the portion 27 of the shaft 23 in such a manner that it can turn with but not relative to the portion 27. The coupling part 24 may also be connected with the sleeve 29 if desired. It has circumferential portions 36 which extend approximately parallel to the circumference of the brake drum 33 and are formed symmetrically on the portion 34 to provide a substantially bifurcated configuration, as shown in FIG. 5. The latter Figure also shows that the coupling part 35 is provided with analogous portions 37 which overlap the portions 36 axially in part, and are located on the same circular line as the latter. The portions 37 are also symmetrically arranged, as shown in FIG. 5. The coupling part 35 together with the engaging portion 37 is mounted on a sleeve 38 which is turnably journaled on a diameter-reduced portion 23a of the shaft 23. A helical spring 39 has a plurality of turns as shown in FIG. 3, and its ends are bent inwardly in hook-shaped configuration, as shown in FIG. 5, such that they extend between the portions 36, 37 of the coupling parts 34, 35. The dimensions of the spring 39 are so chosen that in normal relaxed condition the spring engages the inner circumferential surface of the brake drum 33 under pressure.

A friction member 40, preferably of high-friction synthetic plastic material, or of rubber, is mounted on the actuating member 25, to which it is connected by means of the pin 41 so as to be pivotable relative to the member 25. An edge face of the member 40 is contoured to the outer circumferential suface of the brake drum 33 which it engages, so that an undesired displacement of the member 25 with reference to the brake drum, for instance as a result of vibrations of a vehicle in which the seat is installed, is avoided while, on the other hand, no significant interference exists with the free operation of the member 25 if and when it is desired to do so.

A coupling rod 43 connects each of the coupling members 16 with the coupling member 17 that is located at the same side of the seat. The coupling rod 43 is connected to the respective member 16, 17 by means of pins 44, 45, respectively. These pins, incidentally, are also located at a level below the pivots 19. The pin 44 has the additional purpose of providing a connection for a compensating spring 46 one end of which is connected to the pin 44 whereas the other end is connected to the support structure 10. The spring 46 serves to support at least a part of the weight of the support structure and of a user. The reinforcements 47 are embossed in the side walls 10′ to stiffen the latter, and they also serve to guide the coupling members 16, 17 and the rod 43 during their movement.

In the illustrated embodiment both sides of the seat are provided with gear drives coupling the support structure 10 and the seat frame structure 13, being constructed symmetrically and being coupled for synchronous movement by a rod 49. FIG. 3 shows most cleary that prismatic end portions 26 of the shafts 23 are inserted into hollow open ends of the rod 49 in mating relationship so that the rod 49 turns with the shafts 23 and transmits motion between them.

The operation of the seat structure according to the present invention will by now be obvious. If the seat is to be raised, that is if the seat frame 13 is to be raised with respect to the support structure 10, it is merely necessary for a user to grasp the actuating member 25 and to pivot it. In the exemplary embodiment pivoting of the actuating member 25 in clockwise direction will result in raising of the seat, and in counterclockwise direction it will cause lowering of the seat. It goes without saying that this relationship could be reversed if such were desired.

In any case, if it is desired to raise the seat, a user grasps the actuating member 25 and pulls upwardly on it, that is pivots it in clockwise direction in FIG. 1. This causes initially the coupling part 35 to be turned in similarly clockwise direction with the member 25, and the coupling part 35 in turn entrains and takes along the end portion of the spring 39 which is closest in the direction of rotation, that is the one which it encounters first. Evidently, this causes the spring 39 to be tensioned beyond its normal position, so that its diameter decreases as the spring contracts. The spring thus disengages the inner surface of the brake drum 33 and turning of the coupling part 35 continues until a portion 37 thereof engages a corresponding portion 36 of the coupling part 34, whereby the latter now becomes entrained and also turns. The coupling part 34 turns the shaft 23 and thus the gear 22 which moves along the teeth of the gear segment on the coupling member that is so provided. This causes this coupling member to be pivoted about the pivot 19 in clockwise direction, whereby the seat frame structure 13 is raised upwardly with respect to the support structure 10.

During this rotation of the gear 22, the motion of the gear and shaft 23 is transmitted to the gear 22 and shaft 23 at the opposite side of the seat (in the upper part of FIG. 3), due to the connection via the rod 49, so that the coupling member 16 associated with this other gear 22 and similarly provided with a gear segment 21, is also moved in clockwise direction. At the same time, the pivoting of the coupling members 16 is transmitted to their respectively associated coupling members 17 via the respective connecting rods 43, so that the coupling members 17 also pivot in clockwise direction, so that the seat frame structure 13 is raised uniformly.

When the desired level of elevation has been reached, the user releases his grasp on the actuating member 25. Contrary to the prior art, this results in an immediate blocking of any downward movement of the seat frame structure 13, because the spring 39 which was previously tensioned by the coupling part 35, relaxes again immediately and moves into braking engagement with the inner circumferential surface of the brake drum 33, thus preventing any further turning of the coupling part 34 that could result in a downward movement of the seat frame structure 13.

Evidently, when it is desired to lower the seat, the opposite operation takes place, that is the actuating member 25 must be pivoted in counterclockwise direction and all the events which have been described above take place in a reverse direction from the one that has been described.

the present invention is highly advantageous, as has been pointed out earlier. One of the advantages is the fact that it is possible to dispense with separate members carrying the gear segments 21, and to form the latter directly on some other members that link the support structure 10 and the seat frame 13 in any case, namely the coupling members 16. This of course simplifies the construction. By having the radius of curvature of the gear 22 be smaller than that of the gear segment 21, or conversely having that of the gear segment 21 be larger than that of the gear 22, we assure that the force required to be exerted by a user upon the actuating member 25 can be relatively low. Associating the members 16, 17, the gear 22 and the friction brake with the support structure 10 and the seat frame structure 13 in the manner which has been illustrated in FIGS. 1–5, has the advantage that the construction overall can be of relatively low height. Of course, variations are possible and will offer themselves to those skilled in the art. It is also possible to provide the actuating member 25 on the seat frame structure, rather than on the support structure, but the mounting on the support structure is preferred so that the member 25 will always be located at a fixed component of the seat, rather than rising and descending with the movable component of the seat.

It will be possible to dispense with the spring 46, but its use has the advantage that it can counteract to a more or less significant extent the weight of the seat itself and that of a user who is supported on it, so that the force required for adjusting the level of the seat can be held relatively low and the seat can be used even while a user is positioned on it. The construction which has been disclosed is particularly advantageous, because it permits an optimum utilization of the spring force at relatively small spring displacement.

The fact that the edge face of the friction member 40 which contacts the outer circumferential surface of the brake drum 33, is contoured to correspond to the outer circumferential surface as is shown in FIG. 2, and further the fact that the friction member 40 is mounted by the pivot 41 on the actuating member 25 and can adjust itself pivotably relative to the member 25, has the advantage that the friction member 40 can accommodate itself in a very simple and highly effective manner to the outer circumferential surface of the brake drum 33, thus always providing maximum braking effect under all circumstances.

It is conceivable to use the gear transmission between the teeth of the components 21 and 22 only at one side of the seat, not at opposite sides as illustrated for instance in FIG. 3. However, the illustrated embodiment has the advantage of providing for a more uniform raising and lowering of the seat and for compensating in the event the seat is unevenly loaded, for instance if a person is sitting only on one side of the seat and nobody is sitting on the other side, or if persons of significantly different weights are sitting at the opposite sides of the seat. The use of the rod 49 to connect the shafts 23 with one another has the advantage of simplicity, and in particular is advantageous in terms of the assembly and disassembly of the construction.

It will be understood that each of the elements described above, or two or more together, may also find a useful application in other types of constructions differing from the types described above.

While the invention has been illustrated and described as embodied in a seat construction, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a seat, particularly in a vehicle seat, a combination comprising a support structure; a seat frame structure; a plurality of elongated coupling members, at least one of which is provided with a row of teeth; pivot means, including for each of said coupling members a first pivot connecting the coupling member to said support structure and a second pivot spaced longitudinally of said coupling member from said first pivot and connecting said coupling member to said frame structure; actuating means for pivoting said coupling members about the respective pivot thereof so as to steplessly raise or lower said seat frame structure relative to said support structure between selectable positions, said actuating means comprising a spur gear continuously meshing with said row of teeth and being turnably journalled on one of said structures and an actuating member operatively connected to said gear for turning the same; and retaining means for retaining said seat frame structure in the respective selected position and comprising a springloaded friction brake, said activating means and said retaining means allowing said seat to be located at any desired position between said highest and lowest positions.

2. A combination as defined in claim 1, wherein said row of gear teeth is formed as a gear segment.

3. A combination as defined in claim 2, wherein said one coupling member is an elongated arm having two spaced end portions, said second pivot being connected with said arm in the region of one of said end portions and said first pivot being connected with said arm intermediate said first pivot and the other of said end portions; and wherein said gear segment is formed on said other end portion.

4. A combination as defined in claim 3, wherein said gear segment has a radius of curvature which is greater than said radius of curvature of said gear.

5. A combination as defined in claim 1, wherein said gear is journaled on said support structure.

6. A combination as defined in claim 5, wherein said seat frame structure is movable between a lowest and a highest position relative to said support structure, and wherein at least in said lowest position said first pivot of said one coupling member is located at a level above the level of said second pivot and the level of a turning axis of said gear.

7. A combination as defined in claim 1; and further comprising biasing means permanently tending to pivot said coupling member to a position in which said seat frame structure is raised.

8. A combination as defined in claim 7, wherein said biasing means comprises contraction spring means having one end connected with said support structure, and another end operatively connected with said one coupling member at a level below the level of said first pivot of said one coupling member.

9. A combination as defined in claim 8, wherein said one coupling member is provided with a mounting portion to which said other end of said spring means is connected; and further comprising a connecting rod connected with said mounting portion and with at least one other of said coupling members.

10. A combination as defined in claim 1, wherein said actuating means further comprises a mounting shaft which is turnably journaled and which said gear is fixedly mounted; and wherein said spring-loaded friction brake has one brake element fixedly mounted on said mounting shaft and another brake element which is freely turnably mounted on said mounting shaft.

11. A combination as defined in claim 10, wherein said support structure has an upright side wall portion and a mounting bracket connected to and spaced from said side wall portion; and wherein said mounting shaft is journaled in both said side wall portion and said mounting bracket.

12. A combination as defined in claim 11, said side wall portion and said bracket being formed with openings through which portions of said mounting shaft extend, said portions being of polygonal cross-section; and further comprising tubular bearing sleeves surrounding said portions of said mounting shaft and journaling the latter in said side wall portion and said bracket, respectively.

13. A combination as defined in claim 10, wherein said actuating means further comprises an actuating member engageable by a user and being connected with said other brake element; said friction brake further having a stationary brake drum, and said actuating member being provided with a friction member movable with said actuating member and engaging said brake drum.

14. A combination as defined in claim 13, wherein said friction member has an edge face which frictionally engages said brake drum.

15. A combination as defined in claim 14, said brake drum having an outer circumferential contact face, and said edge face being contoured in conformance with said contact face; and further comprising a mounting pivot mounting said friction member on said actuating member for movement with but with freedom of pivotal displacement relative to said actuating member.

16. A combination as defined in claim 1, wherein said structures have two spaced opposite sides; wherein said one coupling member and gear are located at one of said opposite sides; further comprising an additional coupling member similar to said one coupling member and an additional gear cooperating with said additional coupling member, both being located at the other of said sides; and further comprising connecting means connecting said gears for joint turning movement.

17. A combination as defined in claim 16, wherein each of said gears is fixedly mounted on a turnably journaled mounting shaft, each of said mounting shafts having a portion of polygonal cross-section which projects towards the respectively opposite side; and wherein said connecting means comprises a rod having respective hollow end portions each of which matingly accommodates one of said portions of polygonal cross-section.

* * * * *